United States Patent
Lu et al.

(10) Patent No.: US 12,399,556 B2
(45) Date of Patent: Aug. 26, 2025

(54) METHOD FOR GAZE ESTIMATION BASED ON PHYSICALLY INTERPRETABLE FEATURES

(71) Applicant: Beihang University, Beijing (CN)

(72) Inventors: Feng Lu, Beijing (CN); Yiwei Bao, Beijing (CN)

(73) Assignee: Beihang University, Beijing (CN)

( * ) Notice: Subject to any disclaimer, the term of this patent is extended or adjusted under 35 U.S.C. 154(b) by 46 days.

(21) Appl. No.: 18/421,687

(22) Filed: Jan. 24, 2024

(65) Prior Publication Data
US 2024/0310904 A1 Sep. 19, 2024

(30) Foreign Application Priority Data
Mar. 16, 2023 (CN) .......................... 202310269468.X

(51) Int. Cl.
G06F 3/01 (2006.01)
G06V 10/774 (2022.01)
G06V 10/82 (2022.01)
G06V 40/18 (2022.01)

(52) U.S. Cl.
CPC ............ *G06F 3/013* (2013.01); *G06V 10/774* (2022.01); *G06V 10/82* (2022.01); *G06V 40/18* (2022.01)

(58) Field of Classification Search
None
See application file for complete search history.

(56) References Cited

U.S. PATENT DOCUMENTS

| | | | |
|---|---|---|---|
| 2017/0316264 A1* | 11/2017 | Gustafsson | G06F 3/012 |
| 2022/0253135 A1* | 8/2022 | Cohen | G06F 3/013 |
| 2023/0210365 A1* | 7/2023 | Chan | G02B 27/0093 345/8 |
| 2023/0306789 A1* | 9/2023 | Vemulapalli | G06V 40/166 |
| 2024/0303889 A1* | 9/2024 | Drozdov | G06V 40/168 |
| 2025/0131583 A1* | 4/2025 | Ling | G06T 7/80 |

* cited by examiner

*Primary Examiner* — Talha M Nawaz

(57) ABSTRACT

The embodiments of the present disclosure disclose a method for gaze estimation based on physically interpretable features. A specific mode of implementation of this method comprises: constructing a first convolutional neural network, inputting a user's facial image, extracting image features, and regression fitting to obtain an estimated value of the gaze direction; transforming the image features extracted by the first convolutional neural network into physically interpretable features through data processing algorithms, and performing gaze estimation through physically interpretable features; training a gaze estimation model based on physically interpretable features, and on the basis of the trained first convolutional neural network, continuing to optimize the first convolutional neural network using the physically interpretable features.

9 Claims, 1 Drawing Sheet

100

101 — Constructing a first convolutional neural network, inputting a user's facial image, extracting image features, and regression fitting to obtain an estimated value of a gaze direction 102 — Transforming the image features extracted by the first convolutional neural network into physically interpretable features through data processing algorithms, and performing gaze estimation through the physically interpretable features 103 — Training a gaze estimation model based on the physically interpretable features, and on the basis of the trained first convolutional neural network, continuing to optimize the first convolutional neural network using the physically interpretable features

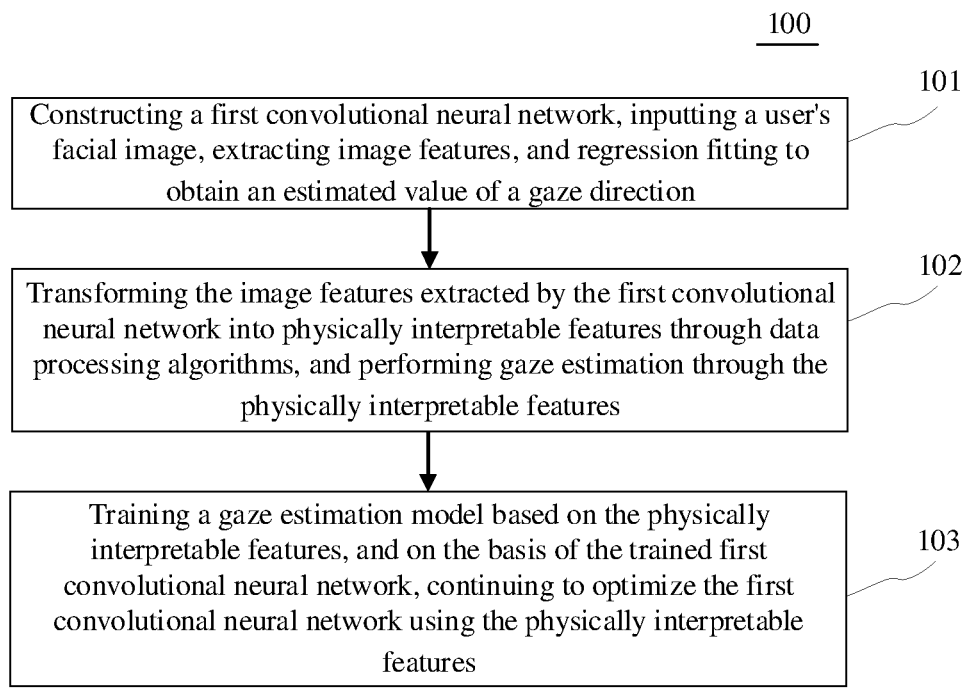

METHOD FOR GAZE ESTIMATION BASED ON PHYSICALLY INTERPRETABLE FEATURES

CROSS-REFERENCE TO RELATED APPLICATION

The present application is based on, and claims priority from, Chinese application number 202310269468X, filed on Mar. 16, 2023, the disclosure of which is hereby incorporated by reference herein in its entirety.

TECHNICAL FIELD

The embodiments of the present disclosure relate to the field of computer technology, and in particular, to a method for gaze estimation based on physically interpretable features.

BACKGROUND

The line of sight is an important clue that reveals the way people understand the external environment. Gaze estimation technology has been widely applied in such fields as human-computer interaction, virtual reality, augmented reality, and medical analysis. In recent years, the gaze estimation technology based on convolutional neural networks has attracted a lot of attention. Its characteristic is that only a single webcam is required to capture user facial images, and it does not require personal calibration to track the direction of the user's line of sight. Although having achieved good results on many public datasets, the CNN-based gaze estimation technology often decreases markedly in accuracy when crossing domains, due to significant differences in environmental factors such as user appearance, lighting, imaging quality, shooting angle, and the like between datasets and between datasets and actual usage scenarios. This characteristic limits the application of the CNN-based gaze estimation technology in practical scenarios, therefore, solving this problem is of great significance for gaze estimation technology.

Gaze estimation technology refers to the technique of calculating the direction of a user's line of sight through captured facial images of the user. Currently, cutting-edge technologies typically use CNN to solve the gaze estimation problem, wherein the input is the user's facial image captured by an RGB camera, and the output is a 3-dimensional direction vector that represents the user's gaze direction in the camera coordinate system.

SUMMARY

The content of the present disclosure is to briefly introduce the concepts, which will be described in detail in the section of detailed description of the present disclosure later. The content of the present disclosure is not intended to identify key or necessary features of the claimed technical solution, nor is it intended to limit the scope of the claimed technical solution.

Some embodiments of the present disclosure propose a method for gaze estimation based on physically interpretable features to address one or more of the technical issues mentioned in the background of the present application above.

Some embodiments of the present disclosure provide a method for gaze estimation based on physically interpretable features, which can effectively improve the generalization ability of a gaze estimation model, thereby improving the gaze estimation accuracy of the model in other scenarios different from the training set (i.e., improving the cross-domain gaze estimation accuracy). Some embodiments of the present disclosure include two parts. The first part is gaze estimation based on physically interpretable features. This part proposes a new method for gaze estimation: first, the high-dimensional features extracted by a convolutional neural network are processed through dimensionality reduction or other interpretable methods, to obtain physically interpretable features, which are three-dimensional features having consistent characteristics with the physical definition of the gaze direction. Through the relationship between the physically interpretable features and the physical definitions, the direction of the line of sight can be calculated and obtained analytically. The second part is the training of a gaze estimation model based on physically interpretable features. According to the new method for gaze estimation in the first part, the gaze estimation model is trained on a training set, the trained model then performs the gaze estimation using the method proposed in the first part, which can effectively improve the accuracy of the model's gaze estimation in other scenarios.

BRIEF DESCRIPTION OF THE DRAWINGS

The above and other features, advantages, and aspects of the embodiments of the present disclosure will become more apparent in conjunction with the accompanying drawings and with reference to the following specific implementations. Throughout the drawings, the same or similar reference signs indicate the same or similar elements. It should be understood that the drawings are schematic, and the components and elements are not necessarily drawn to scale.

FIG. 1 is a flowchart of some embodiments of a method for gaze estimation based on physically interpretable features according to the present disclosure.

DETAILED DESCRIPTION OF THE INVENTION

Hereinafter, the embodiments of the present disclosure will be described in more detail with reference to the accompanying drawings. Although certain embodiments of the present disclosure are shown in the drawings, it should be understood that the present disclosure may be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

Besides, it should be noted that, for ease of description, only the portions related to the relevant invention are shown in the drawings. In the case of no conflict, the embodiments in the present disclosure and the features in the embodiments may be combined with each other.

It should be noted that such concepts as "first" and "second" mentioned in the present disclosure are only used to distinguish different devices, modules or units, and are not used to limit the order of functions performed by these devices, modules or units or interdependence thereof.

It should be noted that such adjuncts as "one" and "more" mentioned in the present disclosure are illustrative, not restrictive, and those skilled in the art should understand that, unless the context clearly indicates otherwise, they should be understood as "one or more".

The names of messages or information exchanged between multiple devices in the embodiments of the present disclosure are only for illustrative purposes, and are not intended to limit the scope of these messages or information.

The present disclosure will be described in detail below with reference to the accompanying drawings and in conjunction with embodiments.

FIG. 1 is a flowchart 100 of some embodiments of a method for gaze estimation based on physically interpretable features according to the present disclosure. The method for gaze estimation based on physically interpretable features comprises the following steps:

Step 101, constructing a first convolutional neural network, inputting a user's facial image, extracting image features, and regression fitting to obtain an estimated value of the gaze direction. Wherein, the first convolutional neural network is trained on a training set until convergence.

Step 102, transforming the image features extracted by the first convolutional neural network into physically interpretable features through data processing algorithms, and performing gaze estimation through physically interpretable features. Wherein, the physical interpretable features satisfy the following characteristics: being distributed in a three-dimensional space, being distributed over the surface of a sphere, and the corresponding spherical direction having very high topological consistency with the eyeball direction corresponding to the line of sight.

Wherein, the physical interpretable features are obtained through a dimensionality reduction algorithm based on the image features extracted by the first convolutional neural network, and are approximately distributed over the surface of the sphere in a three-dimensional space, and the yaw angle, pitch angle, and gaze direction true value of the physical interpretable features have approximate order-preserving and conformal properties.

In practice, an estimated value of the gaze direction can be directly obtained by subjecting the physical interpretable features to numerical mapping and simple physical transformations such as rotation, scaling and translation etc. . . . Wherein, the parameters of the numerical mapping and simple physical transformations such as rotation, scaling and translation are determined on the training set by minimizing the error between the estimated value of the gaze direction and the true value. In practical application scenarios, the parameters determined on the training set are directly used. According to the distribution position of the physical interpretable features, the spherical surface is fit so that the physical interpretable features are distributed over this spherical surface as much as possible, i.e., to minimize the error between the distance from the physical interpretable features to the center of the sphere and the radius of the sphere. After calculating the center of the sphere, perform rotational and translational calculation to the physical interpretable features with the center of the sphere as the center.

Step 103, training a gaze estimation model based on physically interpretable features, and on the basis of the trained first convolutional neural network, continuing to optimize the first convolutional neural network using the physically interpretable features.

Wherein, when calculating a loss function value, obtain the loss function value by calculating the true value of the gaze direction and the estimated value of the gaze direction calculated through physical transformations, numerical mapping and other analytical algorithms, and train the first convolutional neural network through gradient backpropagation.

In practice, the physical interpretable features may be approximatively calculated by constructing a gradient backpropagator to improve the training speed of the network: iteratively perform the following steps until the backpropagator loss function is less than a set threshold. Input the image features extracted by the first convolutional neural network, calculate to obtain an estimated value of the output physical interpretable features through the gradient backpropagator, and calculate the error between the estimated value and the constructed physical interpretable features as the backpropagator loss function.

Here, the adjacency matrix of all image features may be calculated, and the geodesic distance between image features pairwise may be calculated through the adjacency matrix. During dimensionality reduction, the specific position of the physical interpretable features may be calculated by keeping the Euclidean distance between the physical interpretable features consistent with the geodesic distance between the corresponding image features.

Wherein, after completing the training, in practical application scenarios, input the user's facial image, and after adopting the image features extracted by the first convolutional neural network, use not the regression fitting method to calculate the estimated value of the gaze direction, but calculate the estimated value of the gaze direction by constructing the above physical interpretable features and a mapping based on physical transformations.

In summary, some embodiments of the present disclosure are as follows:

First, the gaze estimation based on physically interpretable features: To start with, use conventional methods to train a gaze estimation model whose structure is a convolutional neural network on the source domain. This type of gaze estimation model generally converts the input facial image into a high-dimensional feature vector (such as 512 dimensions) through a convolutional neural network, and then regresses the high-dimensional feature vector through multi-layer perceptron (MLP) to obtain the three-dimensional gaze direction. In one implementation manner, a neural network with a model structure of Resnet18 may be used for training through a L1 loss function. After the training is completed, the high-dimensional feature vector extracted by the gaze estimation model is dimensionally reduced using the Isometric Mapping (Isomap) algorithm to obtain three-dimensional physically interpretable features. In this section, other dimensionality reduction methods may also be used. After obtaining physically consistent features, an estimated value of the gaze direction is calculated by fitting the position of physically interpretable features in the three-dimensional space based on the true value of the corresponding sample's gaze direction. One possible fitting method is as follows: first, based on the distribution position of physical interpretable features, search for a sphere so that the physical interpretable features are distributed over the surface of the sphere as much as possible. Then, rotate all physically interpretable features around the center of the ball. After rotation, calculate the yaw angle and the pitch angle of the physically interpretable features relative to the center of the sphere, then linearly map the yaw angle and the pitch angle respectively, thus obtaining the estimated value $g_i=(\alpha, \beta)$ of the gaze direction. The calculation formulas are as follows:

$$(x_i, y_i, z_i) = R(f_i - O_c).$$

$$\begin{cases} \alpha = k_1 \arctan\left(\dfrac{-x_i}{-z_i}\right) + b_1 \\ \beta = k_2 \arcsin(-y_i) + b_2 \end{cases}.$$

Wherein, R is the rotation matrix, $f_i$ is a physically interpretable feature, $O_c$ is the center of the sphere found, and $(x_i, y_i, z_i)$ represents the unit vector of the gaze direction. $x_i, y_i, z_i$ is the coordinate value of the unit vector on three axes. arctan represents the arctangent function, arcsin represents the arcsine function. $k_1, k_2, b_1, b_2$ are linear fitting parameters. Wherein, R only has three degrees of freedom, so it is equivalent to three unknowns. $O_c$ is the three-dimensional center of the sphere, also being three unknowns, the $k_1, k_2, b_1, b_2$ linear fitting parameters have a total of four unknowns, and there are a total of ten unknowns in all the gaze estimation steps based on physical consistency. The ten unknowns are obtained by fitting according to the above process on the training set based on the physical interpretable features of a large number of training samples and the truth values of corresponding gaze estimation.

Second, the training of the gaze estimation model based on physically interpretable features: In the training set, use the above gaze estimation method based on physical consistency to obtain an estimated value of the gaze direction according to the input facial images. Calculate a L1 loss function based on the estimated value of the gaze direction and the true value of the gaze estimation, and perform gradient backpropagation to train the convolutional neural network in the gaze estimation model. After the training is completed, also through the above gaze estimation method based on physical consistency, obtain an estimated value of the gaze direction according to the input facial images.

To solve the problems of time-consuming Isomap and difficult gradient backpropagation in the above physically consistent gaze estimation method, another possible implementation approach is as follows: construct a multi-layer perceptron (MLP) called gradient backpropagator, and simulate the Isomap algorithm by training on a training set. The input of the gradient backpropagator is a high-dimensional feature vector obtained from a convolutional neural network, and the output is a three-dimensional vector. By learning on the training set, the output of the gradient backpropagator is made close to physically interpretable features. After the learning is completed, the parameters in the gradient backpropagator are fixed. During the training process of the physically consistent gaze estimation model, use the gradient backpropagator to replace the Isomap thereby solving the problem of difficult Isomap gradient backpropagation, and train the convolutional neural network.

The above description is merely some preferred embodiments of the present disclosure and illustrations of the applied technical principles. Those skilled in the art should understand that the scope of the invention involved in the embodiments of the present disclosure is not limited to the technical solutions formed by the specific combination of the above technical features, and should cover at the same time, without departing from the above inventive concept, other technical solutions formed by any combination of the above technical features or their equivalent features, for example, a technical solution formed by replacing the above features with the technical features of similar functions disclosed in (but not limited to) the embodiments of the present disclosure.

The invention claimed is:

1. A method for gaze estimation based on physically interpretable features, comprising:
    constructing a first convolutional neural network, inputting a user's facial image, extracting image features, and regression fitting to obtain an estimated value of a gaze direction, wherein, the first convolutional neural network is trained on a training set until convergence;
    transforming the image features extracted by the first convolutional neural network into the physically interpretable features through data processing algorithms, and performing the gaze estimation through the physically interpretable features, wherein, the physical interpretable features satisfy the following characteristics: being distributed in a three-dimensional space, being distributed over a surface of a sphere, and a corresponding spherical surface direction having very high topological consistency with an eyeball direction corresponding to the line of sight;
    training a gaze estimation model based on the physically interpretable features, and on the basis of the trained first convolutional neural network, continuing to optimize the first convolutional neural network using the physically interpretable features.

2. The method of claim 1, wherein, the physical interpretable features are obtained through a dimensionality reduction algorithm based on the image features extracted by the first convolutional neural network, and are approximately distributed over the surface of the sphere in the three-dimensional space, and a yaw angle, a pitch angle, and the gaze direction true value of the physical interpretable features have approximate order-preserving and conformal properties.

3. The method of claim 1, wherein, performing gaze estimation through the physically interpretable features includes:
    subjecting the physical interpretable features to numerical mapping and simple physical transformations such as rotation, scaling and translation, to directly obtain the estimated value of the gaze direction.

4. The method of claim 3, wherein, parameters of the numerical mapping and simple physical transformations such as rotation, scaling and translation are determined on the training set by minimizing an error between the estimated value of the gaze direction and a true value, and in practical application scenarios, the parameters determined on the training set are directly used.

5. The method of claim 1, wherein, the on the basis of the trained first convolutional neural network, continuing to optimize the first convolutional neural network using the physically interpretable features, includes:
    when calculating a loss function value, obtaining the loss function value by calculating the true value of the gaze direction and the estimated value of the gaze direction calculated through physical transformations, numerical mapping and other analytical algorithms, and training the first convolutional neural network through gradient backpropagation.

6. The method of claim 1, wherein, the method further comprises:
    approximatively calculating the physical interpretable features by constructing a gradient backpropagator to improve a training speed of the network: iteratively performing the following steps until a backpropagator loss function is less than a set threshold; inputting the image features extracted by the first convolutional neural network, calculating to obtain an estimated value of the output physical interpretable features through the gradient backpropagator, and calculating an error between the estimated value and the constructed physical interpretable features as the backpropagator loss function.

7. The method of claim 1, wherein, after completing the training, in practical application scenarios, inputting the user's facial image, and after adopting the image features extracted by the first convolutional neural network, using not a manner of the regression fitting to calculate the estimated value of the gaze direction, but calculating the estimated value of the gaze direction by constructing the physical interpretable features and a mapping based on physical transformations.

8. The method of claim 6, wherein, the calculating the physical interpretable features includes:

calculating an adjacency matrix of all image features, and calculating a geodesic distance between the image features pairwise through the adjacency matrix, and during dimensionality reduction, calculating and obtaining a specific position of the physical interpretable features by keeping an Euclidean distance between the physical interpretable features consistent with the geodesic distance between the corresponding image features.

9. The method of claim 3, wherein, the subjecting the physical interpretable features to numerical mapping and simple physical transformations such as rotation, scaling and translation to directly obtain the estimated value of the gaze direction includes:

fitting a spherical surface according to distribution positions of the physical interpretable features so that the physical interpretable features are distributed over this spherical surface as much as possible, i.e., to minimize an error between a distance from the physical interpretable features to a center of the sphere and a radius of the sphere; after calculating the center of the sphere, performing rotational and translational calculation to the physical interpretable features with the center of the sphere as a center.

* * * * *